United States Patent [19]

Huang

[11] Patent Number: 5,179,800
[45] Date of Patent: Jan. 19, 1993

[54] SELF-WATERING AIR-PRODUCING PLANT TRAY SYSTEM

[76] Inventor: Barney K. Huang, 3332 Manor Ridge Dr., Raleigh, N.C. 27603

[21] Appl. No.: 715,608

[22] Filed: Jun. 14, 1991

[51] Int. Cl.⁵ .............................................. A01G 9/02
[52] U.S. Cl. ...................................................... 47/73
[58] Field of Search ................... 47/85, 86, 87, 73, 75, 47/77, 71, 79, 59

[56] References Cited

U.S. PATENT DOCUMENTS

| | | | |
|---|---|---|---|
| D. 242,267 | 11/1976 | Feeney, Jr. | 47/59 |
| 1,851,052 | 3/1932 | McElroy | 47/86 |
| 3,142,133 | 7/1964 | Brooks | 47/86 |
| 3,712,252 | 1/1973 | Huang | 47/87 |
| 3,751,852 | 8/1973 | Schrepper | 47/87 |
| 4,224,765 | 9/1980 | Song | 47/85 |
| 4,242,834 | 1/1981 | Olseh | 47/86 |
| 4,255,898 | 3/1981 | Greenbaum | 47/79 |
| 4,312,152 | 1/1982 | Drury et al. | 47/87 |
| 4,495,725 | 1/1985 | Talbott | 47/85 |
| 4,584,791 | 4/1986 | Wolf | 47/79 |
| 4,785,578 | 11/1988 | Grene | 47/86 |
| 4,918,863 | 4/1990 | Youssef | 47/77 |
| 4,926,587 | 5/1990 | van Wingerden | 47/77 |

FOREIGN PATENT DOCUMENTS 614346 11/1979 Switzerland ............................ 47/71

*Primary Examiner*—David A. Scherbel
*Assistant Examiner*—Michele A. Van Patten
*Attorney, Agent, or Firm*—Rhodes, Coats and Bennett

[57] ABSTRACT

The present invention entails a plant growing tray system which includes a tray with a plurality of individual plant cells having an open top and bottom and a detachable screen or perforated bottom. Each tray cell is designed to contain and hold a plant growing medium such as peat cake or peat-soil mix. A detachable bottom secured to the bottom part of the plant tray provides air-pruning of plant roots and can be conveniently removed from the plant tray for easy removal of the individual plants or seedlings from the tray bottom. Air-pruning of plant roots eliminates root binding or tangling and accelerates root branching resulting in enhanced plant growth in the cell or after transplanting.

The plant tray has a surrounding edge to hold a water level above the top of the tray cell or micro-feeding holes of each cell for self watering and to maintain uniform root zone temperature throughout the tray. The detachable screen or perforated bottom can be press fitted to the tray bottom to hold the peat mix and to provide effective air-pruning of the plant roots.

13 Claims, 2 Drawing Sheets

SELF-WATERING AIR-PRODUCING PLANT TRAY SYSTEM

FIELD OF THE INVENTION

The present invention relates to plant, seedling, and plug containers and trays with detachable screen bottoms for growing and handling air-pruned plants for superior plant growth and to increase agricultural production, including both greenhouse crops and field crops.

BACKGROUND OF THE INVENTION

Healthy seedings of uniform size are required for transplanting in order to produce a superior plant in a greenhouse or in the filed. Many materials, cell/edge/sidewall shapes and sizes of plant growth containers or trays are commercially available for plant or seedling culture varying in price, design and durability. A major problem associated with a conventional tray is root binding or tangling which deters plant root development within the container and after the seedlings are transplanted. An example of the air-pruning tray and its important application as an integral part of the fully automatic transplanting have been disclosed by Dr. Barney K. Huang in U.S. Pat. Nos. 3,712,252 and 3,446,164.

Numerous field tests indicate that the air-pruned cuttings and seedlings are significantly superior in growth performance both in the trays and after transplanting and that effective fully automatic transplanting can be performed with the air-pruned seedlings for various crops. However, the mass production of an integrated air-pruning tray and detachable screen bottom at a low cost has been a problem due to conventional plastic forming processes.

SUMMARY AND OBJECTS OF THE INVENTION

The present invention entails a plant growing tray system that is designed to improve overall performance and overcome the difficulties of mass production techniques. In particular, the plant growing tray of the present invention is provided with an elevated edge to hold water surrounding each tray cell for self watering, increased tray rigidity, and maintenance of uniform root-zone temperature throughout the tray. During the fully automated transplanting operation, the indexed trays can be filled with water to facilitate rapid seedling removal and injection with water for efficient transplanting operation. In the present disclosure, the detachable bottom screen or perforated bottom also has a surrounding edge so that it can be press fitted into the bottom portion of the air-pruning tray to maintain a tight fit and increase tray system rigidity for self-support, easy handling and shipping of fully grown seedlings in the tray system.

It is therefore an object of the present invention to provide a plant growing tray system that enables the plant tray to effect and carry out effective air-pruning with easily attachable and detachable screen bottom and to meet the requirements of plastic forming processes for quality mass production at low cost.

Another object of the present invention resides in the provision of a plant tray structure having a surrounding edge to hold water surrounding each tray cell for self watering, increased tray rigidity, and maintaining uniform root-zone temperature through the tray.

Another object of the present invention is to provide a plant tray with a quickly detachable, frictionally fitted bottom tray screen that can be easily connected to the bottom of the plant tray as well as easily removed from the bottom of the plant tray.

Still a further object of the present invention resides in the provision of a frictionally fitted detachable screen for the bottom of a plant tray wherein the screen when fitted to the plant tray is firmly held thereon and forms a generally rigid plant tray and screen structure.

Other objects and advantages of the present invention will become apparent and obvious from a study of the following description and the accompanying drawings which are merely illustrative of such invention.

DETAILED DESCRIPTION OF THE INVENTION

Figure 1:
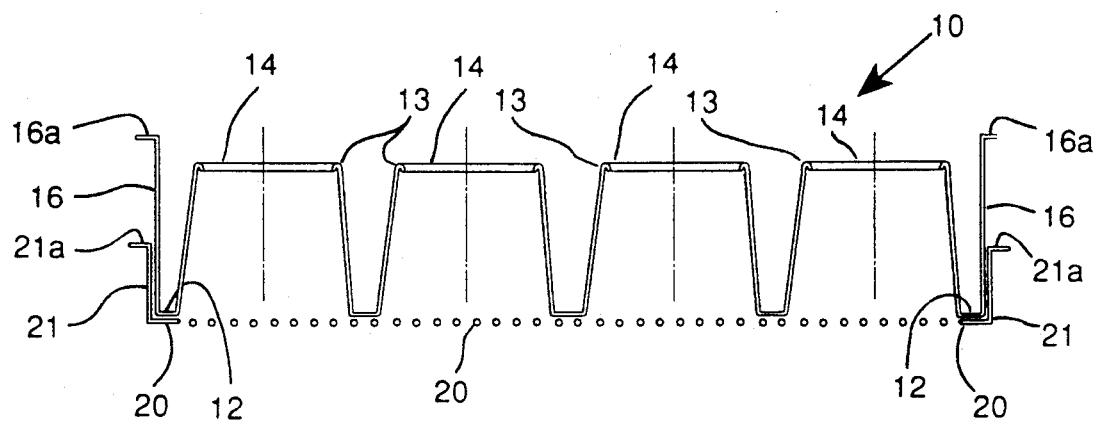
FIG. 1 is a fragmentary cross-sectional view that illustrates an integrated plant growing tray system of the present invention showing the surrounding edge of the air-pruning tray and the surrounding edge of the detachable screen or perforated bottom which is press fitted into the bottom portion of the air-pruning tray.
Figure 2:
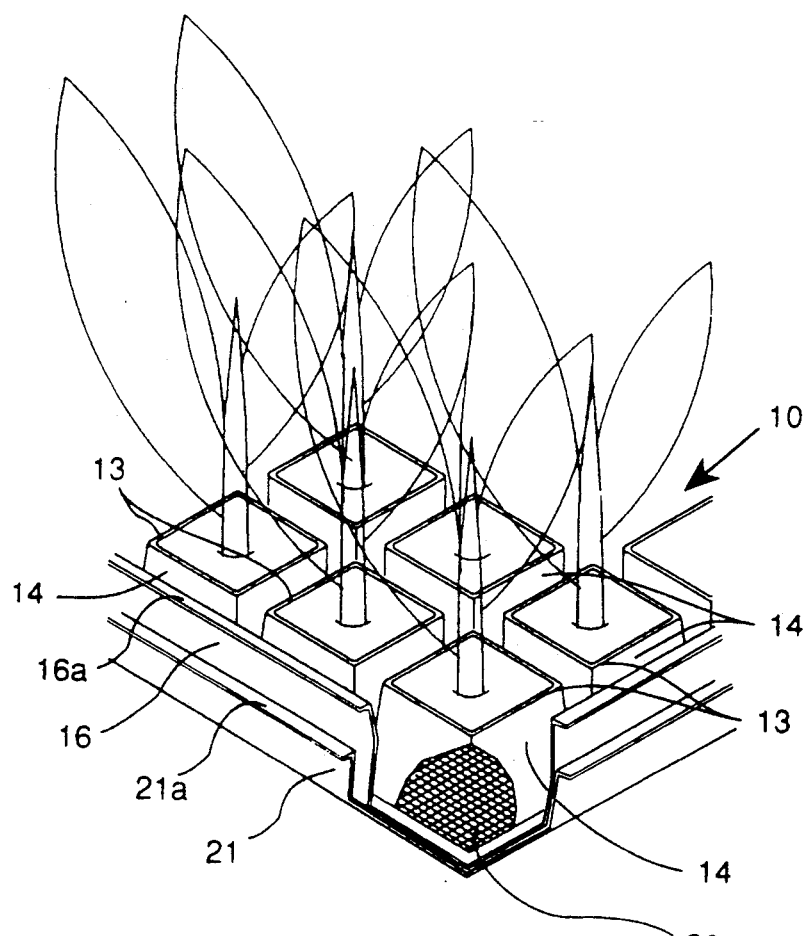
FIG. 2 is a fragmentary view of the plant tray and screen with portions of the plant tray broken away to better illustrate the screen.

With further reference to the drawings, the air-pruning tray structure of the present invention is shown therein and indicated generally by the numeral 10 in FIG. 1 and 2. Plant tray structure 10 includes a main plant holding body that comprises a base 12, a plurality of aligned and uniformly spaced truncated pyramid shaped cells 14 and surrounding sides 16 which holds water surrounding each cell for self watering from the cell top or microholes in the cell wall and maintain uniform temperature throughout the tray. Formed about the upper portion of side 16 is an outwardly directed edge or flange 16a. The existence of side 16 surrounding the outer edge of tray increase the rigidity of tray for easy handling. Side 16 is designed to fit into the index frame of the fully automatic transplanting machine for indexing. Each cell tapers upward from the open-bottom which provides air-pruning and eliminates root-tangling and root-binding. The open-top of each cell edge has a small inward curl 13 to facilitate the passage of plant shoots during transplanting.

Press fitted to the bottom portion of the tray 10 is a detachable screen or perforated bottom 20 which functions to hold and confine the plant growing medium within each cell. The bottom also has a surrounding side 21 which is designed to fit snugly into the bottom portion of the tray 10. Formed about the upper portion of side 21 is an outwardly directed edge or flange 21a.

After pressing the detachable bottom 20 into the tray 10, the rigidity of the integrated tray system increases considerably for easy handling and shipping of seedlings. One can readily remove the screen 20 from the plant tray 10 by pressing edge 16a and side 21a apart. This facilitates removing screen 20 from plant tray 10.

Figure 3:
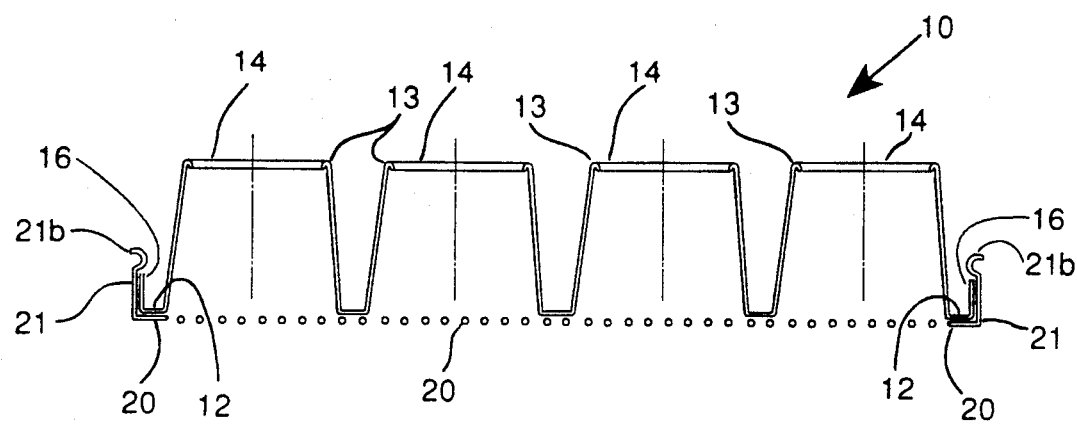
FIG. 3 is a fragmentary cross-sectional view that illustrates another design of integrated plant growing tray system of the present invention showing the surrounding edge of the air-pruning tray and the surrounding edge of the detachable screen or perforated bottom which is click fitted into the bottom portion of the air-pruning tray.

FIG. 3 discloses yet another embodiment of the present invention that is similar in principal to the embodiment shown in FIG. 1. The basic difference is that in the embodiment illustrated in FIG. 3 the side of the detachable bottom 20 is click fitted into the indented edge of the air-pruning tray. In particular, the upturn side 21 includes an upper curled click 21b that tends to be biased over the upper terminal side 16 of the tray. Thus, it is appreciated that click 21b tends to positively hold the screen 20 about the bottom of the plant tray 10.

Figure 4:
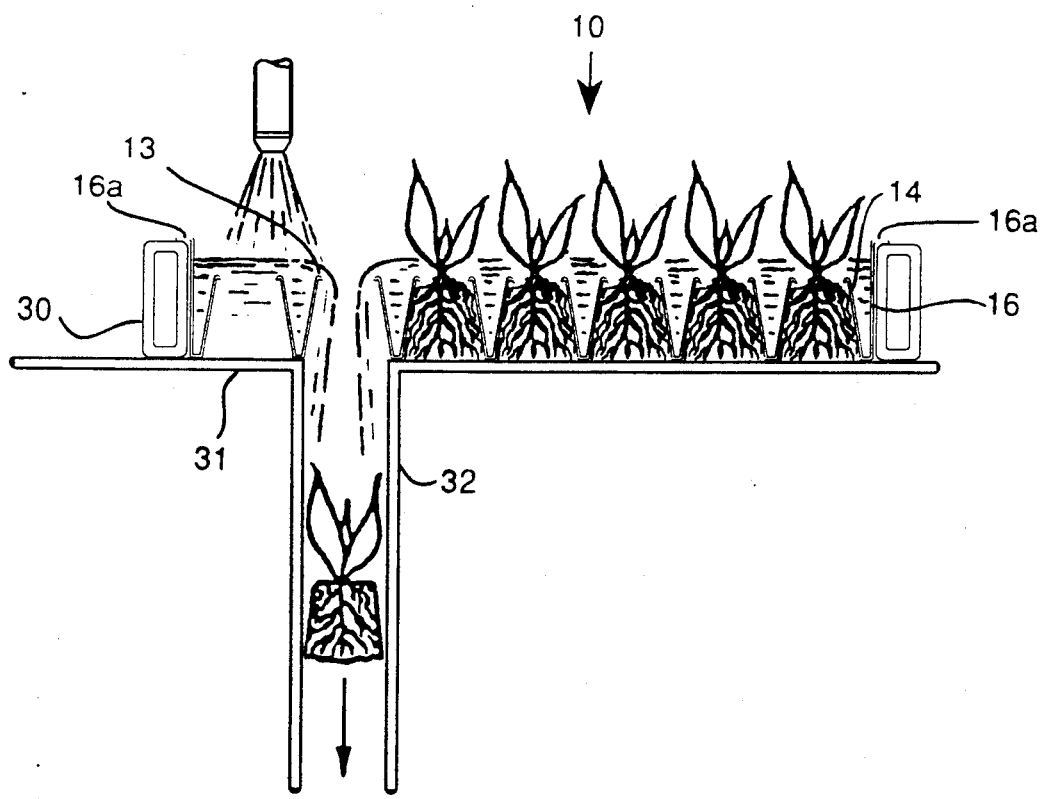
FIG. 4 is a schematic fragmentary cross-sectional view that illustrates the air-pruned seedling being shot out from the tray with water to facilitate fully automated transplanting.

FIG. 4 illustrates the application of this air-pruning tray to fully automated transplanting. The plant loaded tray 10 is fitted into the indexing frame 30 over the plant bearing plate 31 of the transplanter. As the tray cell 14 is indexed over the suction drop tube 32, both plant and water are injected simultaneously to a planting area, whether it be in the field, in a pot, or in the other containers. The presence of the water is of course important in providing for the well being of the plant after transplanting, but the water also provides an effective seal between the tray 10 and bearing plate 31 and consequently contributes to the efficient inducement of plants from the plant tray during transplanting. Also, the downward force of the water from the injection tube needs to provide an opening within the soil or other plant medium for receiving the plant. Additionally, the downward force of the injected water tends to cover the plant root area once the plant has been set in the soil or plant growing medium.

From the above specification and discussion, it is appreciated that the detachable, frictionally fitted screen 20 has numerous advantages in that the same can be easily and quickly attached and detached from the plant tray 10. As appreciated from the drawings, the screen 20 includes an upturn side 21 that is designed to frictionally engage the upturn side 16 of the plant tray. To remove screen 20 from the bottom of plant tray 10, all that is required is that the frictional force holding the screen 20 about the bottom of the plant tray 20 be overcome.

The present invention may, of course, be carried out in other specific ways than those herein set forth without parting from the spirit and essential characteristics of the invention. The present embodiments are, therefore, to be considered in all respects as illustrative and not restrictive, and all changes coming within the meanings and equivalency range of the appended claims are intended to be embraced therein.

What is claimed is:

1. An air pruning plant tray with a readily detachable frictionally fitted bottom screen comprising: a plant tray having a top, bottom, surrounding side structure, and means incorporated within the plant tray for containing a plant growing medium such as soil, peat cake or peat mix; a screen detachably secured to the bottom of the plant tray for retaining the plant growing medium within the plant tray and for giving rise to air pruning, and the detachable screen including a turned up side that extends around the parameter of the screen and wherein the turned up side in an attached mode frictionally engages and couples with the surrounding side structure of the plant tray and effectively couples the screen to the bottom of the plant tray so as to form a unitary plant tray and screen structure, and wherein the screen can be readily removed from the surrounding side structure of the plant tray by pulling the screen away from the plant tray and overcoming the friction existing between the turned up side of the screen and the surrounding side structure of the plant tray.

2. The air pruning plant tray of claim 1 wherein the turned up side of the screen frictionally engages the exterior of the surrounding side structure of the plant tray such that the plant tray tends to be nested within the turned up side of the screen.

3. The air pruning plant tray of claim 1 wherein the turned up side of the screen includes an upper outer projecting edge.

4. The air pruning plant tray of claim 3 wherein the surrounding side structure of the plant tray includes an outer directed upper tray edge and wherein in the attached mode there is a vertical space defined between the upper tray edge and the upper edge of the turned up side of the screen that permits fingertips to be positioned therebetween for separating the screen from the plant tray.

5. The air pruning plant tray of claim 1 wherein the surrounding side structure of the screen is at least slightly flexible so as to permit the plant tray to be easily and conveniently nested within the surrounding side structure of the screen.

6. The air pruning plant tray and detachable screen of claim 1 wherein the surrounding side structure of the plant tray includes an upper terminal edge and wherein the upturn side of the screen includes an inwardly directed clip that extends over the upper terminal edge of the surrounding side structure of the plant tray so as to securely couple the screen to the plant tray.

7. The air-pruning plant tray of claim 1 wherein the surrounding sidewall structure of the plant tray is designed to hold water.

8. The air-pruning plant tray of claim 7 wherein the plant tray includes a plurality of plant cells and wherein there is provided microholes in respective plants cells for the purpose of self-watering.

9. The air-pruning plant tray of claim 7 wherein the surrounding sidewall structure of the plant tray extends above the height of the plant cells so that respective plants in the plant cell can be uniformly watered from the top.

10. The air-pruning plant tray of claim 7 wherein the water held within the tray gives rise to a generally uniform temperature throughout the tray.

11. The air-pruning plant tray of claim 7 wherein the plant tray is adapted to expell water through a respective plant cell when the plant of that cell is removed from the plant tray such that the expelled water moves downwardly with the removed plant as it is directed to a planting site.

12. A method of coupling and decoupling a screen to the bottom of a plant tray comprising: nesting a plant tray within a bottom screen having an upturned side structure; frictionally engaging and coupling the surrounding side structure of the plant tray with the upturn side structure of the screen and creating a frictional coupling fit between the plant tray and the screen; and detaching the screen from the plant tray structure by pulling the screen from the tray structure by overcoming the frictional fit between the upturn side structure of the screen and the plant tray.

13. An air pruning plant tray with a readily detachable frictionally fitted bottom screen comprising: a plant tray having a top, bottom, surrounding side structure, and a plurality of truncated plant cells with each plant cell having surrounding wall structure for holding a plant rowing medium such as soil, peat cake or peat mix; a screen detachably secured to the bottom of the plant tray for retaining the plant growing medium within the plant tray and for giving rise to air pruning; and the detachable screen including a turned up side that extends around the parameter of the screen and wherein the turned up side in an attached mode frictionally engages and couples with the surrounding side structure of the plant tray and effectively couples the screen to the bottom of the plant tray so as to form a unitary plant tray and screen structure, and wherein the screen can be readily removed from the surrounding side structure of the plant tray by pulling the screen away from the plant tray and overcoming the friction existing between the turned up side of the screen and the surrounding side structure of the plant tray.

* * * * *

UNITED STATES PATENT AND TRADEMARK OFFICE
CERTIFICATE OF CORRECTION

PATENT NO. : 5,179,800
DATED : January 19, 1993
INVENTOR(S) : Barney K. Huang

It is certified that error appears in the above-identified patent and that said Letters Patent is hereby corrected as shown below:

Title page, item (54) should read-- SELF-WATERING AIR-PRUNING PLANT TRAY SYSTEM --.

Signed and Sealed this

Fifteenth Day of June, 1993

Attest:

MICHAEL K. KIRK

*Attesting Officer*    *Acting Commissioner of Patents and Trademarks*